United States Patent [19]

Takeuchi

[11] Patent Number: 5,479,301
[45] Date of Patent: Dec. 26, 1995

[54] MAGNETIC DISK APPARATUS COMPRISING MEANS FOR CHANGING A SECTOR PERIOD

[75] Inventor: Toshio Takeuchi, Tokyo, Japan

[73] Assignee: NEC Corporation, Tokyo, Japan

[21] Appl. No.: 172,142

[22] Filed: Dec. 23, 1993

[30] Foreign Application Priority Data

Dec. 28, 1992 [JP] Japan .................................. 4-361058

[51] Int. Cl.$^6$ .............................. G11B 5/02; G11B 5/09; G11B 5/596
[52] U.S. Cl. ............................ 360/51; 360/27; 360/77.05
[58] Field of Search .................................. 360/51, 77.02, 360/77.04, 77.05, 77.08, 78.04, 78.14, 98.01, 72.1, 37.1, 26, 36.1, 27; 395/425, 275; 369/32

[56] References Cited

U.S. PATENT DOCUMENTS

| | | | |
|---|---|---|---|
| 5,068,755 | 11/1991 | Hamilton et al. | 360/72.1 |
| 5,270,885 | 12/1993 | Satoh et al. | 360/77.04 |
| 5,276,564 | 1/1994 | Hessing et al. | 360/51 |
| 5,307,218 | 4/1994 | Kitamura et al. | 360/77.08 |

FOREIGN PATENT DOCUMENTS 2112157 12/1993 Canada .
4125859 4/1992 Japan .

Primary Examiner—Aristotelis Psitos
Assistant Examiner—Patrick Wamsley
Attorney, Agent, or Firm—Sughrue, Mion, Zinn, Macpeak & Seas

[57] ABSTRACT

A magnetic disk apparatus including a head disk assembly, a servo control circuit, a head positioning microprocessor, a sector pulse generating circuit, a head selection circuit, and a main controller. The head selection circuit selects any one of disk media in a data read/write operation. The servo control circuit controls an operation of a head positioning motor. The head positioning microprocessor controls an operation of the servo control circuit based on an external command. The sector pulse generating circuit has a plurality of sector counters for counting a clock signal and generating sector pulses having different periods, selects one of the sector pulses from the sector counters based on an input selection signal, and outputs the selected sector pulse always with a predetermined separation or longer. The main controller controls an information write/read operation through the head selection circuit based on the sector pulse output from the sector pulse generating circuit, and outputs a selection signal to the sector pulse generating circuit, thereby performing switching control of the sector pulse.

7 Claims, 5 Drawing Sheets

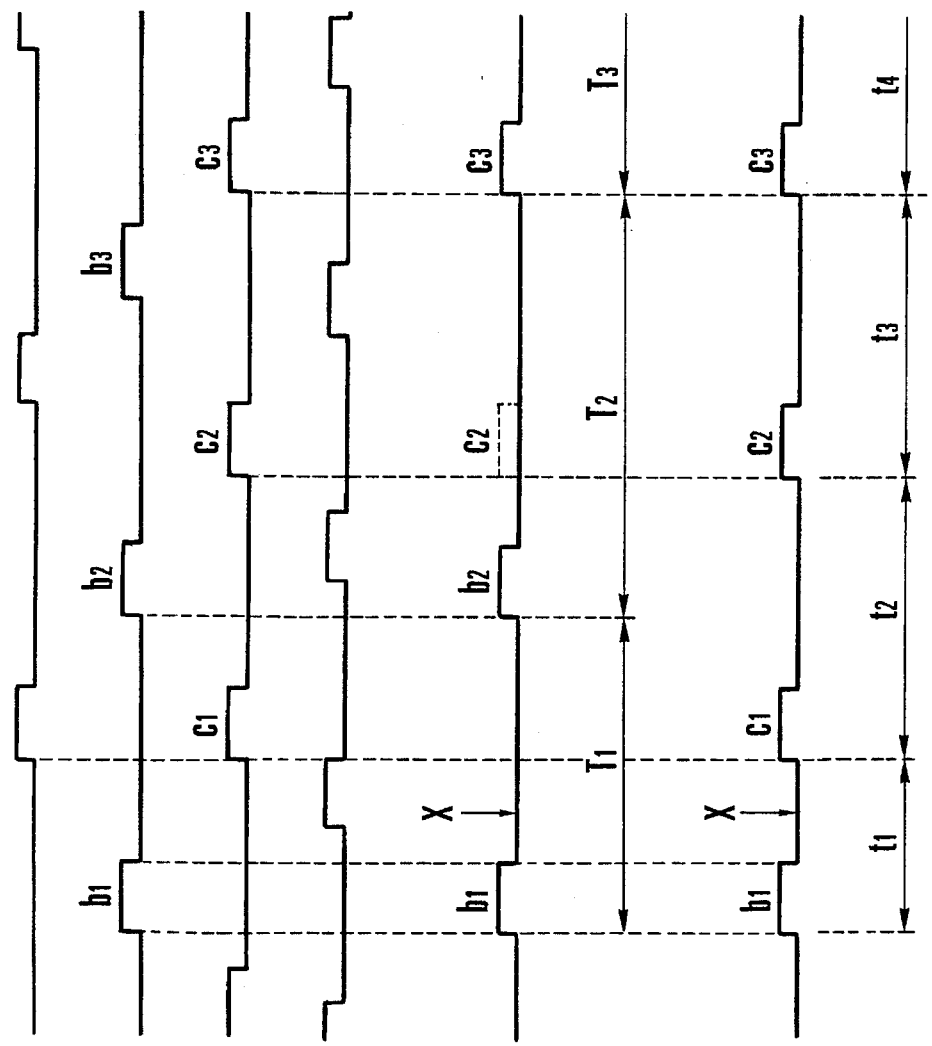
FIG. 4A SECTOR PULSE SIGNAL 100a
FIG. 4B SECTOR PULSE SIGNAL 100b
FIG. 4C SECTOR PULSE SIGNAL 100c
FIG. 4D SECTOR PULSE SIGNAL 100d
FIG. 4E SECTOR PULSE 100
FIG. 4F PRIOR ART SECTOR PULSE GENERATED UPON OUTPUT SWITCHING

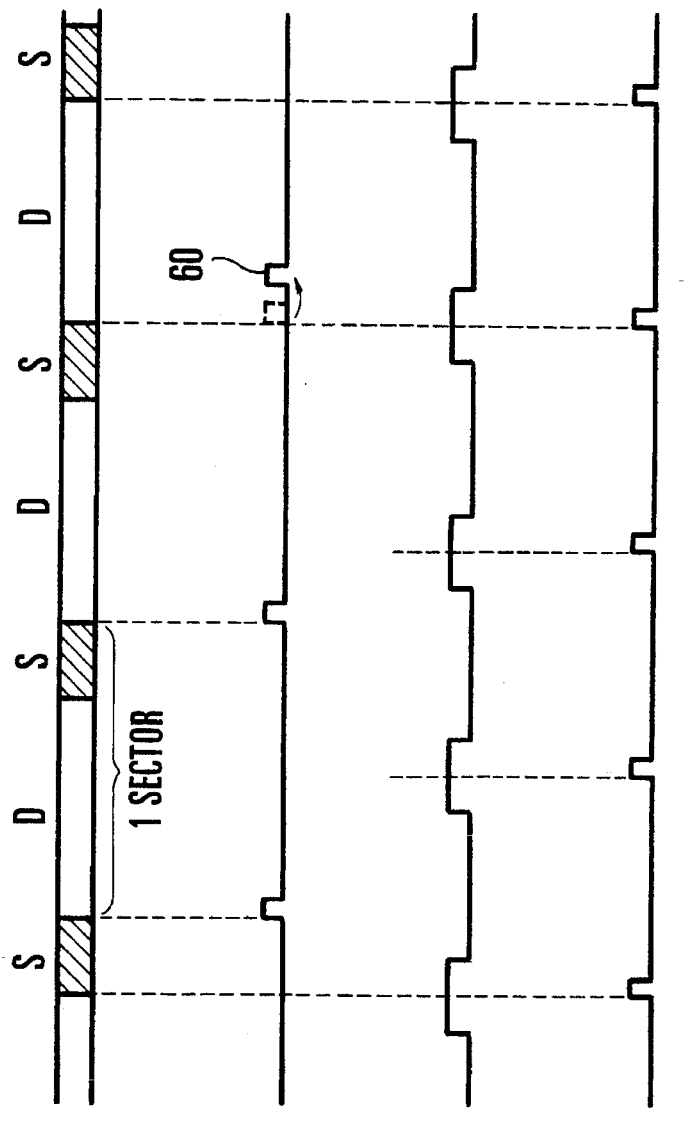

MAGNETIC DISK APPARATUS COMPRISING MEANS FOR CHANGING A SECTOR PERIOD

BACKGROUND OF THE INVENTION

The present invention relates to a magnetic disk apparatus having a plurality of sector periods and, more particularly, to a magnetic disk apparatus comprising a means for changing a sector period.

In a conventional magnetic disk apparatus having a plurality of sector periods, only one counter is provided to define a sector period. When the generation period or timing of a sector pulse is to be changed in order to switch the sector period, the magnetic disk apparatus can only reset the counter or change the count of the counter, and no other means is provided for this purpose. In this conventional magnetic disk apparatus, the timings for sampling the servo surface and data surface of the disk medium are always predetermined.

In the conventional magnetic disk apparatus, since the change of the sector period counter is asynchronous with the counter operation, a short-period sector pulse or a glitch is generated upon a change in the count of the counter. If this short-period sector pulse or glitch is left, it causes a malfunction of a counter that counts the number of sectors per track or a microprocessor (MPU) that controls the write/read operation of the data by using a sector pulse. The A/D conversion start timing of the servo information on the servo surface is not related to the sector period. Thus, when the sector period is changed, the new sector period overlaps the A/D conversion start timing of the servo information on the servo surface which is subjected to sampling, e.g., every sector period, so that sampling is missed. Then, positioning control is degraded.

SUMMARY OF THE INVENTION

It is an object of the present invention to provide a magnetic disk apparatus in which the inconveniences of the prior art technique described above are improved, and occurrence of a short-period sector pulse or glitch upon a change in sector period is effectively eliminated, so that the performance of the overall apparatus is improved.

In order to achieve the above object, according to the present invention, there is provided a magnetic disk apparatus comprising a head disk assembly including a stacked disk medium, magnetic data heads for reading/writing data from/on the disk media, a magnetic servo head for reading servo information from the disk media, a head positioning motor for positioning the magnetic data heads and the magnetic servo head, a spindle motor for integrally rotating the disk media, and a head selection circuit for selecting any one of the disk medium in a data read/write operation, servo control means for controlling an operation of the head positioning motor, head positioning control means for controlling an operation of the servo control means based on an external command, sector pulse generating means, having a plurality of sector counters for counting a clock signal, for generating sector pulses having different periods, for selecting one of the sector pulses from the sector counters based on an input selection signal, and for outputting the selected sector pulse always with a predetermined interval or more, and main control means for controlling an information write/read operation through the head selection circuit based on the sector pulse output from the sector pulse generating means, and outputting a selection signal to the sector pulse generating means, thereby performing switching control of the sector pulse.

BRIEF DESCRIPTION OF THE DRAWINGS

FIGS. 4A to 4F are timing charts showing the operation of the sector pulse generating circuit in FIG. 2; and FIGS. 5A to 5D are timing charts showing the operation of the timing generators in FIG. 3.

DESCRIPTION OF THE PREFERRED EMBODIMENT

A preferred embodiment of the present invention will be described with reference to FIGS. 1 to 5D.

Figure 1:
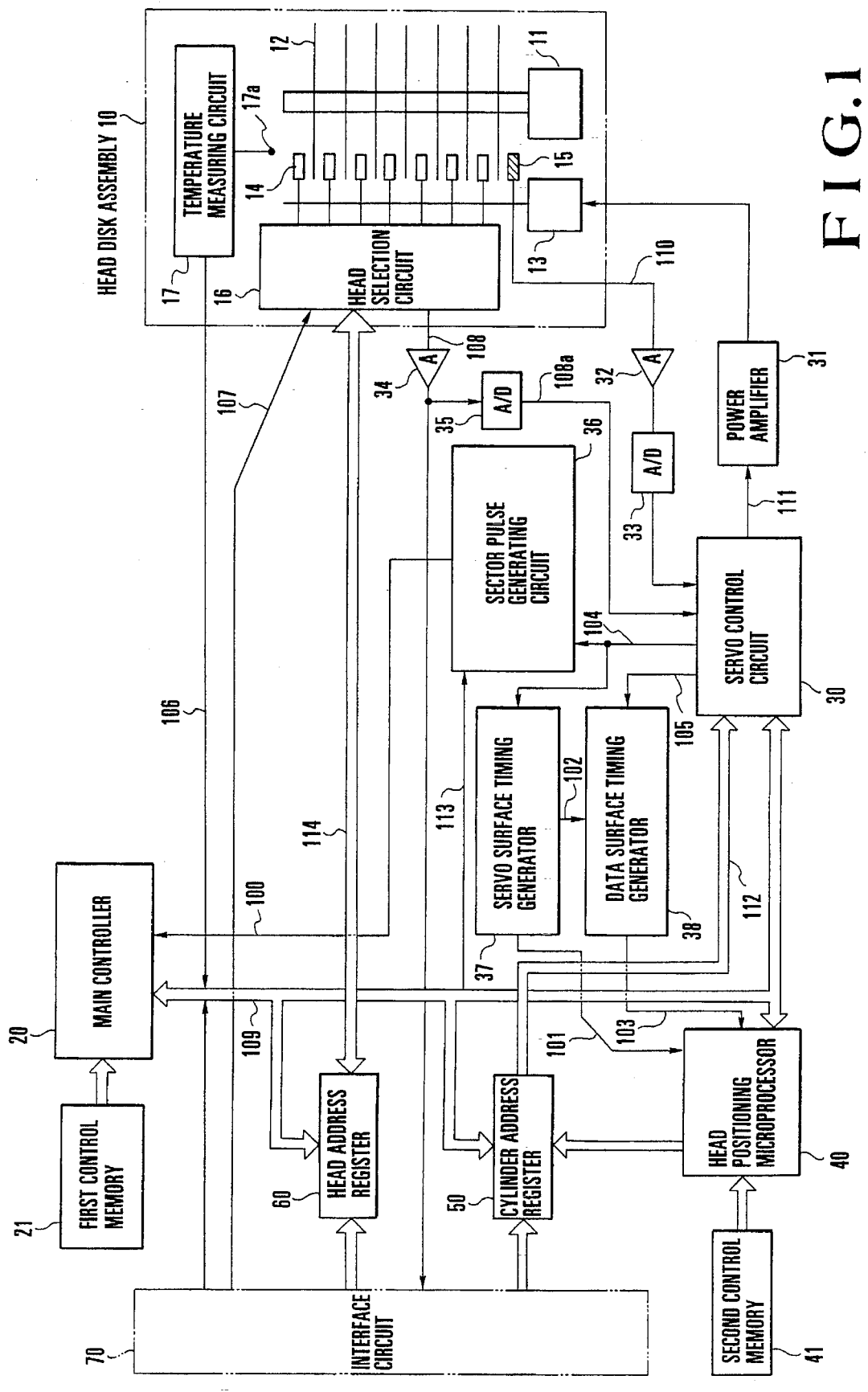
FIG. 1 is a block diagram showing a magnetic disk apparatus according to an embodiment of the present invention.

A magnetic disk apparatus shown in FIG. 1 comprises a head disk assembly 10 having a plurality of stacked disk media 12, a plurality of magnetic data heads 14, a magnetic servo head 15, a spindle motor 11, and a head selection circuit 16. The disk media 12 have a plurality of data surfaces and one servo surface. The magnetic data heads 14 are respectively disposed above the data surfaces of the disk media 12 and positioned by a predetermined positioner. The magnetic servo head 15 reads servo information from the servo surface of the disk media 12. The spindle motor 11 integrally rotates the plurality of disk media 12. When data are to be written on or read from the plurality of disk media 12, the head selection circuit 16 selects any one of the plurality of disk media 12 based on address information from a head address bus 114.

The magnetic disk apparatus also comprises a servo control circuit 30, a head positioning microprocessor 40, and a main controller 20. The servo control circuit 30 controls the operation of a head positioning motor 13. The microprocessor 40 controls the operation of the servo control circuit 30 based on an external command. The main controller 20 comprises a microprocessor and totally controls the operations of the respective portions of the apparatus when information is to be written or read through the head selection circuit 16.

Figure 2:
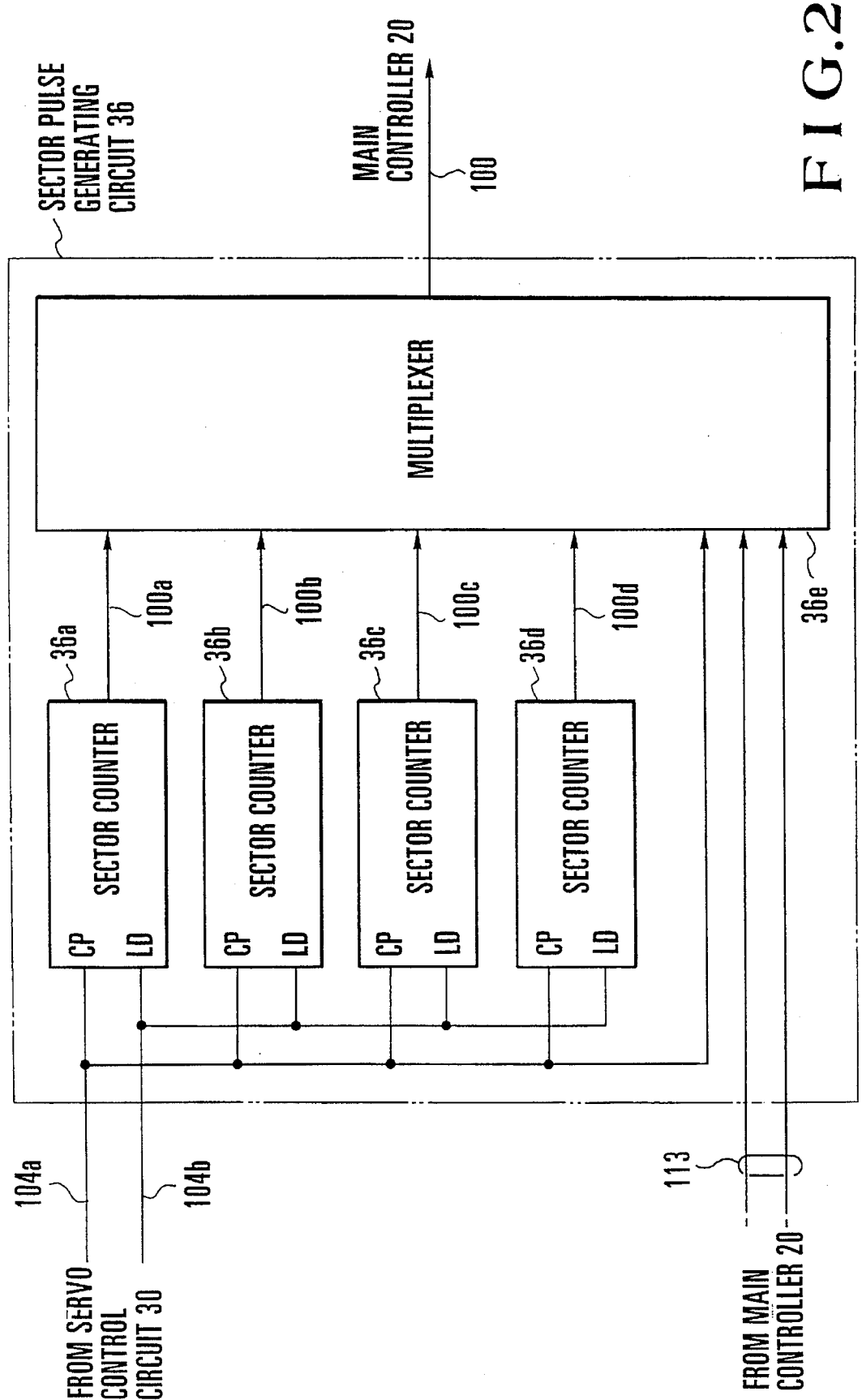
FIG. 2 is a block diagram showing an arrangement of a sector pulse generating circuit shown in FIG. 1.

The magnetic disk apparatus also comprises a sector pulse generating circuit 36 activated by a signal output from the servo control circuit 30 and sends a sector pulse 100 having a predetermined sector period to the main controller 20. As shown in FIG. 2, the sector pulse generating circuit 36 includes a plurality (four in this embodiment) of sector counters 36a to 36d and a multiplexer 36e. The sector counters 36a to 36d output sector pulses having different periods. The multiplexer 36e selects one of the pulses output from the sector counters 36a to 36e as the sector pulse 100 to be output from the sector pulse generating circuit 36 based on the instruction from the main controller 20, and outputs the sector pulse 100 from the selected sector counter to the main controller 20.

A servo surface timing generator 37 and a data surface timing generator 38 are connected to the servo control circuit 30. The servo surface timing generator 37 operates regardless of the sector counters 36a to 36d of the sector pulse generating circuit 36, always outputs a servo start signal 101 for designating A/D conversion start timing of servo information to the head positioning microprocessor 40 (to be described later) at a predetermined timing, and outputs a servo window signal 102 overlapping the servo start signal 101 and having a wide signal width to the data surface timing generator 38. The data surface timing generator 38 operates in accordance with the sector period of the selected one of the sector counters 36a to 36d and outputs a data servo start signal 103 for designating A/D conversion start timing of data servo information. When the timing of the output data servo start signal 103 overlaps the servo window signal 102 output from the servo surface timing generator 37, the data servo start signal 103 is shifted to be output after the servo window signal 102. More specifically, the servo surface timing generator 37 and the data surface timing generator 38 are controlled by control signals 104 and 105, respectively, from the servo control circuit 30. The control signal 104 is also input to the sector pulse generating circuit 36.

When switching among the sector counters 36a to 36d is to be performed, the multiplexer 36e of the sector pulse generating circuit 36 outputs the sector pulse 100 having a period prior to switching in the zone before selection. Then, switching among the sector counters 36a to 36d is performed. The new sector period is initiated by the second sector pulse 100.

Reference numeral 13 denotes the head positioning motor for moving and positioning the magnetic data heads 14 and the magnetic servo head 15. Reference numeral 17 denotes a temperature measuring circuit for supplying the ambient temperature of the magnetic data heads 14 and disk medium 12 detected by a temperature sensor 17a to the main controller 20 by means of a temperature detection signal 106. The main controller 20 performs temperature correction of various types of control signals based on the temperature information supplied from the temperature measuring circuit 17.

The operation of the magnetic disk apparatus will be described in more detail.

The head selection circuit 16 selects any one of the plurality of magnetic data heads 14. In the data write operation, the head selection circuit 16 outputs a write data signal 107, which is output from an I/F interface circuit 70 provided in advance, to the selected magnetic data head 14. In the data read operation, the head selection circuit 16 outputs an output signal 108 from the selected magnetic data head 14 to the I/F interface circuit 70 through an amplifier 34 and to the servo control circuit 30 through an A/D converter 35.

The main controller 20 writes data, reads data, and inputs a seek command in, from, and to a head address register 60, a cylinder address register 50, and the microprocessor 40 and the servo control circuit 30, that are connected thereto independently through a bus 109, in accordance with a control program written in a first control memory 21 which is provided to the main controller 20 in advance, thereby performing the sequence control of the entire disk apparatus. Upon reception of information from the I/F interface circuit 70, the head address register 60 outputs a head selection signal to the head selection circuit 16 through the head address bus 114.

The servo control circuit 30 receives a servo signal 110, read from the servo surface of the disk medium 12 by the magnetic servo head 15 and serving as positioning information, through a servo signal amplifier 32 and a servo signal A/D converter 33, and positioning information 108a, read from the servo area on the data surfaces of the disk medium 12 by the corresponding magnetic data heads 14, through the amplifier 34 and the A/D converter 35. The servo control circuit 30 outputs a positioning control signal 111 to the head positioning motor 13 through a power amplifier 31 to constitute a closed loop, thereby positioning the heads.

The head positioning microprocessor 40 operates in accordance with a control program written in a second control memory 41 provided thereto in advance, and performs, in response to an external command output from the I/F interface circuit 70 described above, head positioning control for the servo control circuit 30 through the cylinder address register 50 and a cylinder address bus 112.

FIG. 2 shows an arrangement of the sector pulse generating circuit 36. As described above, this sector pulse generating circuit 36 is constituted by the multiplexer 36e and the four sector counters 36a to 36d. Counts each corresponding to one sector of each zone are set in the sector counters 36a to 36d by an index signal 104b supplied from the servo control circuit 30. The sector counters 36a to 36d count a servo clock 104a, thereby respectively outputting sector pulse signals 100a to 100d having different periods once per sector. The multiplexer 36e receives the sector pulse signals 100a to 100d output from the respective sector counters 36a to 36d and a 2-bit zone selection signal 113, and outputs the sector pulse 100 of the selected zone to the main controller 20. The zone selection signal 113 is input from the main controller 20 through the bus 109. The multiplexer 36e does not immediately switch the input signal when a zone is selected by the main controller 20, but switches the input signal after one sector pulse 100 is output in a zone before selection, so that the first sector period in the zone after selection is prolonged. Then, a pulse output is allowed starting from the second pulse.

Figure 3:
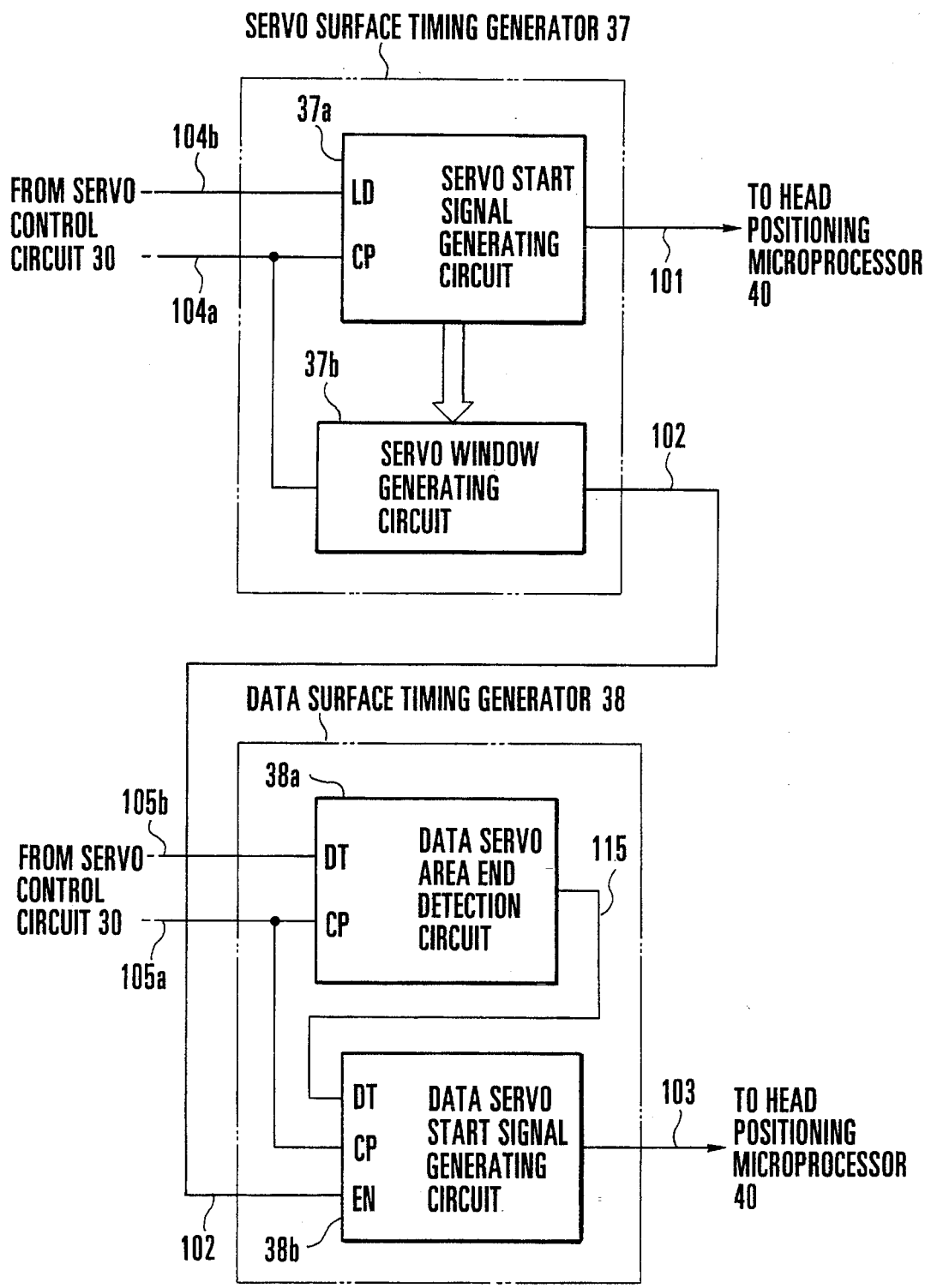
FIG. 3 is a block diagram showing an arrangement of a servo surface timing generator and a data surface timing generator shown in FIG. 1.

FIG. 3 shows an arrangement of the servo surface timing generator 37 and the data surface timing generator 38. Referring to FIG. 3, the servo surface timing generator 37 is constituted by a servo start signal generating circuit 37a and a servo window generating circuit 37b, both of which receive the servo clock 104a. The servo start signal generating circuit 37a defines the sampling period of the servo information on the servo surface. The servo start signal generating circuit 37a generates the servo start signal 101 serving as a first interrupt signal at a predetermined timing with reference to the index signal 104b regardless of the zone, and inputs the generated servo start signal 101 to the head positioning microprocessor 40. Based on the information supplied from the servo start signal generating circuit 37a, the servo window generating circuit 37b outputs the servo window signal 102 which becomes active almost when the first interrupt signal 101 is output.

The data surface timing generator 38 is constituted by a data servo area end detection circuit 38a and a data servo start signal generating circuit 38b, both of which receive a servo clock 105a. The data servo area end detection circuit 38a detects and holds an end pulse 105b of the servo area of the data surface, and outputs a data servo timing signal 115 to the data servo start signal generating circuit 38b. The data servo start signal generating circuit 38b receives the data servo timing signal 115 and the servo window signal 102. When the servo window signal 102 is inactive, the data servo start signal generating circuit 38b outputs the data servo timing signal 115 directly as the data servo start signal 103 serving as a second interrupt signal without any change. When the servo window signal 102 is active, the data servo start signal generating circuit 38b delays output of the second interrupt signal until the servo window signal 102 becomes inactive.

The operation of the above magnetic disk apparatus will be described with reference to FIGS. 4A to 4F and 5A to 5D. FIGS. 4A to 4F are timing charts of the sector pulse signals 100a to 100d output from the sector counters 36a to 36d and the sector pulse 100 output from the multiplexer 36e when the sector period is changed. FIGS. 4A to 4D show the sector pulse signals 100a to 100d of the sector counters 36a to 36d respectively corresponding to zones 1 to 4. Assume that zone 2 is selected, but zone is changed to the zone 3 at a timing X immediately after a sector pulse b1 shown in FIG. 4B is output. In this case, as shown in FIG. 4E, the multiplexer 36e outputs a sector pulse b2 of zone 2 even after the zone is switched by the zone selection signal 113. Then, the multiplexer 36e skips a sector pulse c2 of the zone 3 once, and resumes output starting from a second sector pulse c3. More specifically, even after the zone is switched, the multiplexer 36e outputs one extra sector pulse with the sector period corresponding to that of the zone before switching. After the last sector pulse of the zone before switching is output, the multiplexer 36e skips the sector pulse of the zone after switching once, and resumes output starting from the second sector pulse, so that the first period is prolonged. The multiplexer 36e performs switching control in this manner. Thereafter, the multiplexer 36e outputs the sector pulse 100 at a timing of the zone 3. This sequence is shown in FIG. 4E. Referring FIG. 4E, in a period T1, the sector pulse has one sector period of the zone 2; in a period T2, one sector period of the zone 3+α; and in a period T3, one sector period of the zone 3.

In contrast to this, FIG. 4F shows an example of mere switching of the sector pulses of the respective sector counters. After the zone 2 is switched to the zone 3, a sector pulse c1 of the zone 3 is output. Hence, in a period t1, the sector pulse c1 is output with a shorter duration than the sector period. Then, the processing operation of the main controller 20 that operates upon reception of the sector pulse 100 as an interrupt signal may cause an abnormality, thereby causing a malfunction of the apparatus. In each of periods t2 to t4, the sector pulse has one sector period of the zone 3, and the sector pulses c2 and c3 are output with this sector period. This problem similarly occurs in the conventional apparatus wherein the count and period of one sector counter are changed.

FIGS. 5A to 5D show the relationship between the data servo start signal 103 serving as the second interrupt signal and the servo start signal 101 serving as the first interrupt signal. FIG. 5A shows a track format in which a track is constituted by a plurality of continuous sectors. One sector is constituted by a data area D in which an ID signal and data are recorded, and a data servo area S. As shown in FIG. 5C, the servo window signal 102 becomes active almost when the first interrupt signal 101 of FIG. 5D is generated. As shown in FIG. 5B, the second interrupt signal 103 is generated immediately after the servo area S partly constituting one sector shown in FIG. 5A. When the second interrupt signal 103 overlaps the servo window signal 102, as indicated by a pulse b0 of FIG. 5B, the second interrupt signal 103 is generated by the data surface timing generator 38 after it is shifted until the end of the overlapping servo window signal 102. Thus, overlapping of the first and second interrupt signals 101 and 103 is prevented. That is, the A/D conversion start timing of the servo information on the data surface is delayed more than the A/D conversion start timing of the servo information on the servo surface, so that missed sampling of position information can be avoided.

As has been described above, according to the present invention, there is provided an excellent magnetic disk apparatus which has not been conventionally provided. This magnetic disk apparatus has a plurality of sector periods and uses a sector pulse generator for controlling switching of sector pulses upon a change in sector period, so that a sector pulse is always generated with a predetermined interval or longer. Thus, the erroneous operations of the sector counters, the main controller that controls data write/read operation, and the like can be effectively prevented. The apparatus also uses a timing generator that shifts the data servo start signal for the data surface to a position where it will not overlap the servo start signal of the servo surface. Thus, a degradation in positioning control of the digital servo processing performed by the main controller can be effectively prevented.

What is claimed is:

1. A magnetic disk apparatus comprising:

a head disk assembly including a stacked disk medium having a plurality of zones in which a data read/write operation is performed, magnetic data heads for reading/writing data from/on said disk medium, a magnetic servo head for reading servo information from said disk medium, a head positioning motor for positioning said magnetic data heads and said magnetic servo head, a spindle motor for integrally rotating said disk medium, and a head selection circuit for selecting any one of said magnetic data heads in the data read/write operation;

servo control means for controlling an operation of said head positioning motor;

head positioning control means for controlling an operation of said servo control means based on an external command;

sector pulse generating means, comprising a plurality of sector counters for counting a clock signal and outputting sector pulses having different sector periods corresponding to said zones, for generating one of the sector pulses from said sector counters by selecting said sector counters in accordance with a selection signal; and main control means for controlling the data read/write operation through said head selection circuit in accordance with the sector pulse from said sector pulse generating means, said main control means outputting the selection signal to said sector pulse generating means to perform switching control of the sector pulses, wherein said sector pulse generating means outputs one extra sector pulse from one of said sector counters corresponding to a zone acquired prior to switching zones after reception of the selection signal from said main control means, skips a first sector pulse from one of said sector counters corresponding to a zone acquired after switching zones after outputting the extra sector pulse, and resumes periodical output pulses starting from a second sector pulse.

2. An apparatus according to claim 1, wherein said main control means outputs the selection signal to change the sector periods in an interlocked manner with a change in the zones.

3. An apparatus according to claim 1, wherein said sector pulse generating means further has a multiplexer for receiving the sector pulses from said sector counters and selectively outputting one of the input sector pulses based on the selection signal from said main control means.

4. An apparatus according to claim 1, further comprising:

servo surface timing generating means which operates independently of the sector pulse output from said sector pulse generating means and outputs a servo start signal for designating A/D conversion start timing of servo information always having a predetermined period and a servo window signal overlapping the servo start signal and having a larger signal width than the servo start signal; and data surface timing generating means which operates with the period of the sector pulse output from said sector pulse generating means, outputs a data servo start signal for designating A/D conversion start timing of data servo information immediately after a data servo area and, when the data servo start signal overlaps the servo window signal from said servo surface timing generating means, shifts the data servo start signal to an end of the servo window signal and outputs the shifted servo start signal, and wherein said head positioning control means controls a head positioning operation of said servo control means based on the servo start signal from said servo surface timing generating means and the data servo start signal from said data surface timing generating means.

5. An apparatus according to claim 4, wherein said servo surface timing generating means is constituted by a servo start signal generating circuit for outputting the servo start signal at a predetermined period and a servo window generating circuit for outputting the servo window signal based on information from said servo start signal generating circuit, and said data surface timing generating means is constituted by a data servo area end detection circuit for detecting an end of a data servo area based on information read by said magnetic data heads and outputting a data servo timing signal, and a data servo start signal generating circuit for outputting the data servo start signal based on the servo window signal from said servo window signal generating circuit and the data servo area timing signal from said data servo area end detection circuit.

6. An apparatus according to claim 1, wherein said sector pulse generating means prevents the output of a sector pulse from one of said sector counters corresponding to the zone acquired after switching zones after outputting the extra sector pulse.

7. A magnetic disk apparatus comprising:

a disk medium having a plurality of zones in which a data read/write operation is performed;

a magnetic data head for reading/writing data from/on said disk medium;

a head positioning means for positioning said magnetic data heads;

disk medium rotating means for integrally rotating said disk medium;

sector pulse generating means, for generating one of the sector pulses with sector periods corresponding to the zones in accordance with a selection signal, said sector pulse generating means outputting one extra sector pulse with a first sector period corresponding to the zone acquired prior to switching after reception of the selection signal, skipping a first sector pulse with a second sector period corresponding to the zone acquired after switching after outputting the extra sector pulse, and starting output of periodic sector pulses with the second sector period from the second sector pulse; and main control means for controlling the data read/write operation in accordance with the sector pulses from said sector pulse generating means, said main control means outputting the selection signal to said sector pulse generating means to perform switching control of the sector pulses.

* * * * *